Patented Mar. 30, 1926.

1,578,582

UNITED STATES PATENT OFFICE.

JOHN H. CAUGHLAN, OF OAKLAND, CALIFORNIA.

INGREDIENT FOR PRINTING INKS.

No Drawing.  Application filed May 19, 1924. Serial No. 714,501.

*To all whom it may concern:*

Be it known that I, JOHN H. CAUGHLAN, a citizen of the United States, and resident of Oakland, county of Alameda, State of California, have invented new and useful Improvements in Ingredients for Printing Inks, of which the following is a specification.

My invention has for its object an ingredient to be mixed with pigments and other conventional ingredients to produce printing ink of superior penetration, drying, and surface appearance.

This I accomplish by employing a base of aluminium resinate combined with gelatinous aluminium hydrate ground in a pulp or wet form with lithographic varnish.

My ingredient may be employed in varying percentages from 4 to 35% of the final mixture depending upon the other ink ingredients employed, and the uses to which the finished ink is to be put and conditions under which it is to be used. The proper consistency of the final mixture being under the control and at once evident to one skilled in this art.

My ingredient is formed as follows: I first make a soda soap by boiling together substantially 15 pounds of rosin and 2½ pounds of 98% caustic soda, plus 400 pounds of water. This mixture contains an excess of the caustic soda more than sufficient to saponify the rosin and the previously boiled solution is now precipitated with aluminium sulphate. The rosin combining with the aluminium forms aluminium resinate and the excess caustic soda combines with the aluminium sulphate and forms gelatinous aluminium hydrate. The precipitate is now washed and filtered and is ground while wet with 24 pounds of #00 lithograph varnish. The proportions here given are to be regarded as relative and not necessarily absolute. The variations in the several constituents as found in commerce requiring corresponding variations in the quantities employed. This is more particularly true of the lithographic varnish of which there are many makes and grades on the market.

As one example of printing ink employing my ingredient I have found the following to be highly satisfactory:

32 pounds of lithographic varnish, 5 pounds of heavy lubricating oil, 9 pounds of my printing ink ingredient as set forth above, 50 pounds of dry milory blue.

When the above mixture is ground together an improved and highly satisfactory milory blue ink results therefrom.

I claim:

The process of producing an ingredient for printing ink which consists of mixing substantially 15 pounds of rosin, 2½ pounds of caustic soda and water boiled together and precipitated with a solution of aluminium sulphate, whereby aluminium resinate and gelatinous aluminium hydrate are formed and which when washed and pressed is ground while still wet with 24 pounds of #00 lithographic varnish.

JOHN H. CAUGHLAN.